April 13, 1954

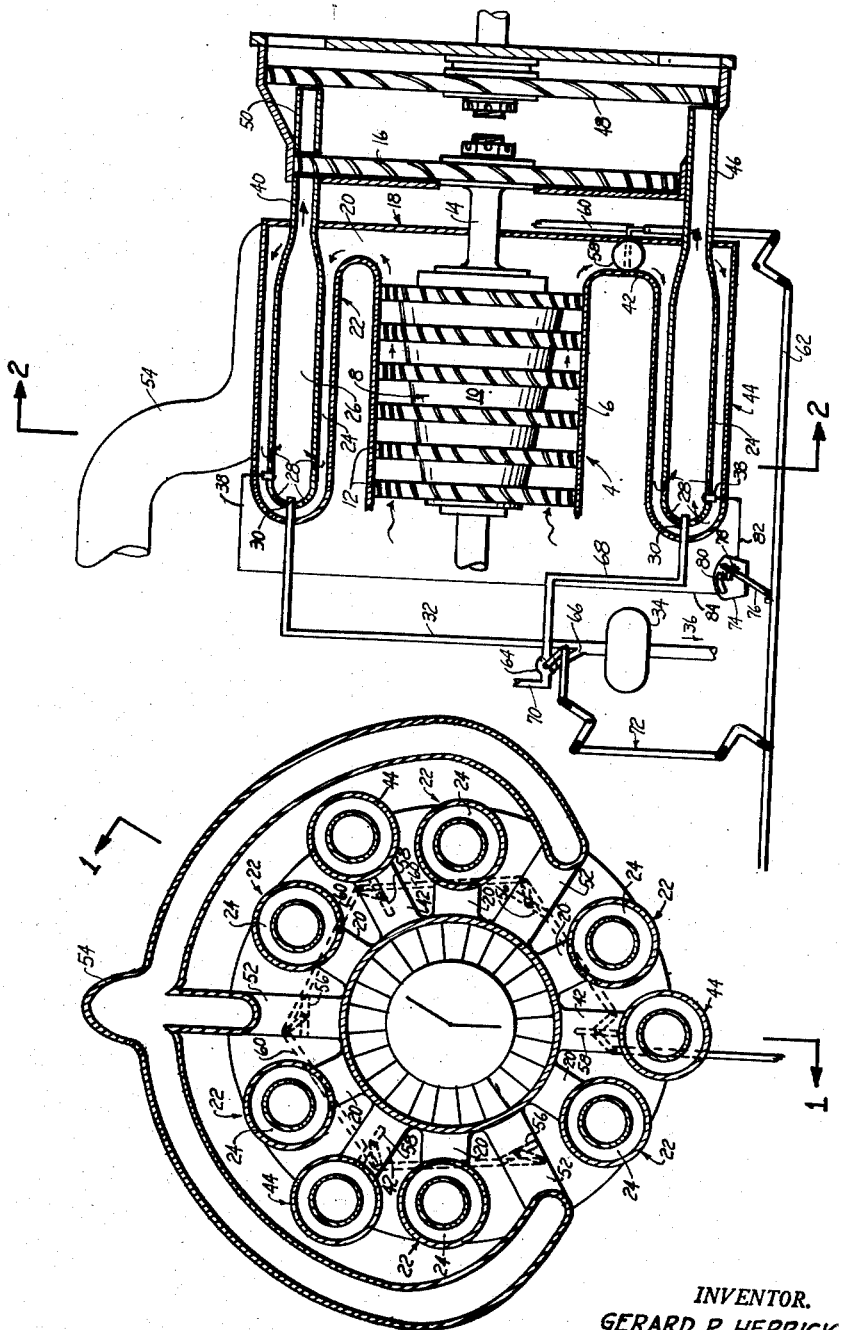

G. P. HERRICK 2,675,195

POWER PLANT FOR AIRCRAFT HAVING VERTICAL AS WELL AS HORIZONTAL PROPULSION

Filed Dec. 14, 1949

INVENTOR.
GERARD P. HERRICK
BY

Patented Apr. 13, 1954

2,675,195

UNITED STATES PATENT OFFICE 2,675,195

POWER PLANT FOR AIRCRAFT HAVING VERTICAL AS WELL AS HORIZONTAL PROPULSION

Gerard P. Herrick, New York, N. Y.

Application December 14, 1949, Serial No. 132,957

5 Claims. (Cl. 244—7)

This invention relates to aircraft power plants, and more particularly to gas turbine power plants adapted for driving the propeller of an aircraft and/or for furnishing compressed air to jet combustion chambers used for auxiliary or alternative power.

The invention provides a power plant having a compressor, a portion of the output of which is furnished to the combustion chambers associated with a turbine coupled to the compressor, and the balance of which may be directed either to combustion chambers associated with a turbine which drives the propeller of the aircraft or to jet combustion chambers used, for example, to drive the rotor wing of a convertible type aircraft. The power plant is so arranged that the propeller turbine also receives partially expended combusted gases from the compressor turbine.

In the drawings,

Figure 1 is a somewhat diagrammatic view of a power plant embodying features of the invention, the power plant being shown in a longitudinal and generally vertical section taken along line 1—1 of Figure 2;

Figure 2 is a transverse vertical section taken along line 2—2 of Figure 1.

Figure 3:
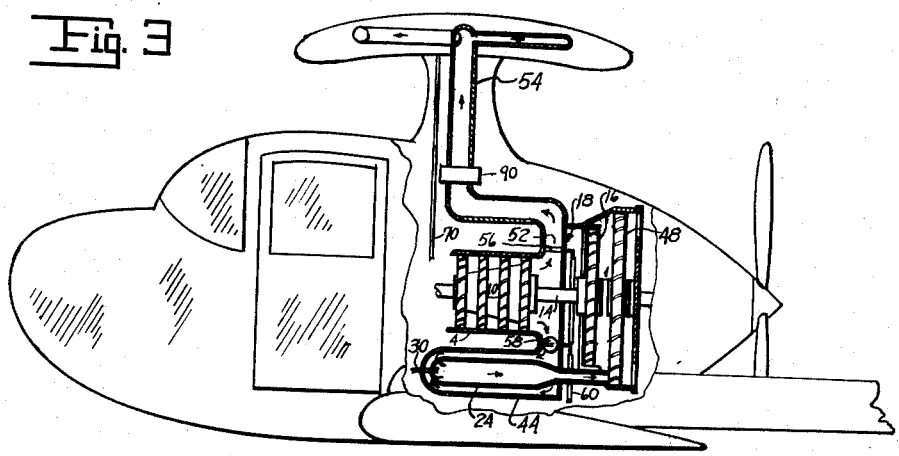
Figure 3 is a side elevation and partially broken away section of the forward portion of a convertible aircraft embodying the present invention.

The power plant of the present invention is designed for use in aircraft of the type having a propeller driven by a turbine. The power plant also has features which adapt it well for use in convertible aircraft—that is, aircraft capable of flying not only as a conventional propeller-driven airplane, but also as a helicopter.

The power plant illustrated in the drawings includes a compressor generally indicated at 4 and having a cylindrical casing 6 in which is axially mounted an impeller generally indicated at 8 and comprising a central spindle 10 and a plurality of stages of impeller blades 12. The intake end of the compressor—the left-hand end as viewed in Figure 1—is provided with a conduit communicating with the exterior of the aircraft. The impeller 8 is rotated by means described hereinafter so that air coming in at the intake of the compressor is compressed by the action of the impeller blades 12 and forced under pressure toward the right as viewed in the drawing. The output end of the compressor is enclosed by a manifold 18 which is provided with twelve outlet ports as may be seen in Figure 2.

Six of the outlet ports 20 communicate with a corresponding number of compressor turbine combustion chambers generally indicated at 22 and each comprising a compressed air intake jacket 24 forming an annular space surrounding the central combustion chamber proper 26. The compressed air intake 24 of each combustion chamber communicates with the central chamber 26 through openings 28 in the wall thereof. Each of the central chambers 26 is provided with a fuel injector 30 which communicates through a fuel line 32 with a fuel pump 34, which is in turn connected to a fuel tank (not shown) so that the pump 34 supplies fuel under pressure from the tank to the combustion chamber. A sparkplug 38 is provided in each combustion chamber for ignition of the fuel and compressed air therein. The resulting high pressure combusted gases are conducted from the combustion chambers 26 through conduits 40 to a compressor turbine 16. The turbine 16 is connected by means of a shaft 14 to the impeller 8 so that, as the compressor turbine is driven by the combusted gases from the combustion chambers, it in turn drives the impeller to furnish compressed air to the combustion chambers.

The arrangement of the compressed air intake jacket 24 around the central combustion chamber 26 serves the dual purpose of cooling the combustion chamber by a forced draft of air and pre-heating the compressed air for more efficient combustion of the fuel.

The manifold 18 is additionally provided with three outlet ports 42 which communicate with a corresponding number of propeller turbine combustion chambers generally indicated at 44. These are similar to the propeller turbine combustion chambers, being provided with compressed air intake jackets 24, central chambers 26, inlet openings 28, fuel injectors 30 and sparkplugs 38.

The output of the propeller turbine combustion chambers 44 is conducted through conduits 46 to a propeller turbine 48 located slightly beyond the compressor turbine 16 and coaxially therewith. The propeller turbine 48 is provided with means for mechanical coupling to the propeller of the aircraft so that rotation of the propeller turbine 48 by the high pressure gases from the combustion chambers 44 will drive the propeller.

In order to allow the conduits 46 to bypass the compressor turbine 16 and pass in straight lines from the combustion chambers 44 to the propeller turbine 48, the propeller turbine 48 is of greater diameter than the compressor turbine 16 and the propeller turbine combustion chambers 44 are spaced from the central axis of the power plant by a greater distance than are the compressor turbine combustion chambers 22.

There are provided between the compressor turbine 16 and the propeller turbine 48, at points opposite each of the conduits 40 which conduct the combusted gases from the combustion chambers 26 to the compressor turbine 16, conduits 50 which collect these gases after a portion of the energy therein has been expanded in driving the turbine 16 and conduct them to the propeller turbine 48, where the major portion of the remaining energy is used in driving the propeller turbine.

Figure 4:
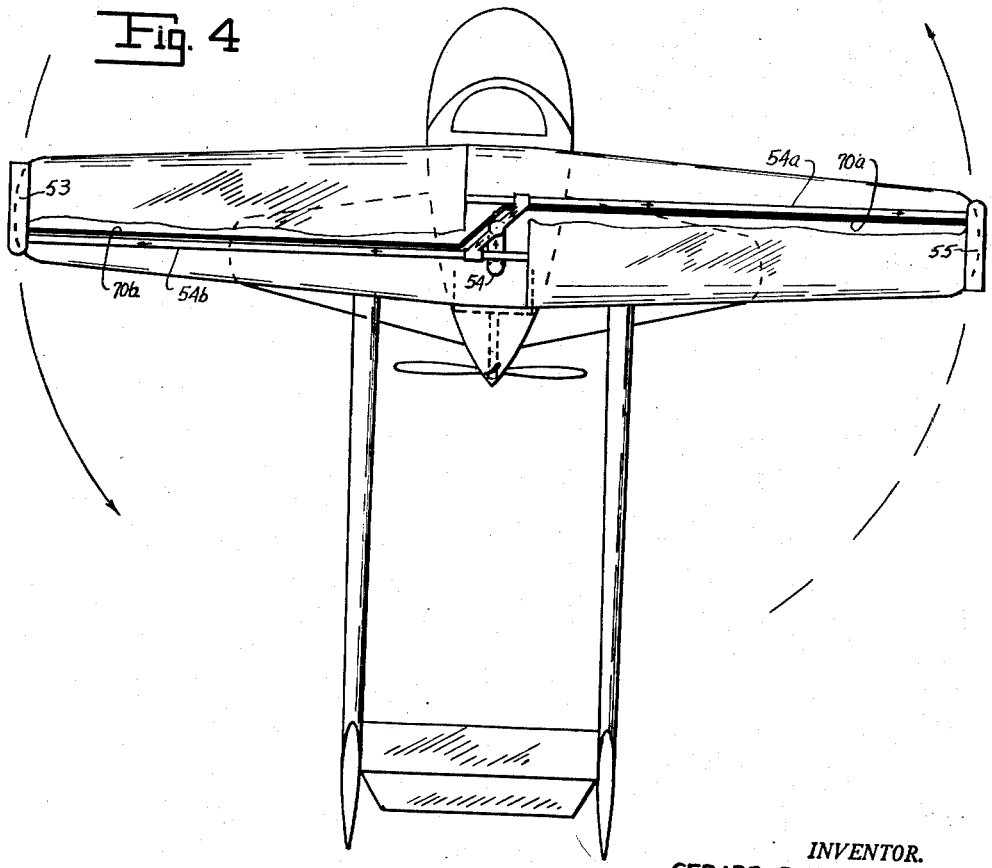
Figure 4 is a top plan view of a convertible aircraft showing the wing tip combustion chambers and the compressed air and fuel feed lines.

In the particular power plant illustrated, which is adapted for use in a convertible aircraft, manifold 18 is additionally provided with three outlet ports 52 (Figure 2) which communicate with a common conduit 54 leading up through the mast head of the aircraft to conduits 54a and 54b and to combustion chambers 53 and 55 (Figure 4) in the rotor wing. They thus serve to supply compressed air from the compressor 4 to the combustion chambers in the rotor wing when it is desired to drive the rotor wing.

The three ports 52 are provided with valves 56, and the three ports 42 are provided with valves 58 which control the amount of compressed air conducted from the manifold 18 and the compressor 4 through their respective ports. The valves 56 and 58 are connected by means of linkages 60 to a common control rod 62 which in turn is linked to a suitable manual control lever (not shown) in the pilot's cockpit. The arrangement is such that the valves 56 are all open when the valves 58 are closed, and vice versa. Accordingly, when it is desired to operate the aircraft as a conventional airplane, the manual control lever and the control shaft 62 are moved to close valves 56 and open valves 58, thereby supplying compressed air to the propeller turbine combustion chambers 44 but not to the rotor wing combustion chambers. When it is desired to operate as a helicopter, the control shaft 62 is moved to shift the supply of compressed air to the rotor wing combustion chambers. The valves are so arranged that, when the control shaft 62 is at positions between its opposite extremes of movement, a portion of the compressed air from the compressor is supplied to the propeller turbine combustion chambers 44 and a portion to the rotor wing combustion chambers. This allows both the propeller and the rotor wing to be supplied power during the interval of changing over from airplane to helicopter flight, to make the changeover smoother and safer. Since the propeller turbine 48 is at all times supplied partially expended combusted air from the compressor turbine 16 through the conduits 50, the propeller will be "idled"—that is, rotated at low speed, even when the aircraft is operating as a helicopter. This facilitates the changeover from helicopter to conventional aircraft flight by reducing the time required to bring the propeller up to its full operating speed.

The shifting of the supply of fuel and ignition between the propeller turbine combustion chambers and rotor wing combustion chambers is likewise effected by means of the control shaft 62. In the case of the shift of fuel, this is accomplished by means of a valve 64 in the line 66 leading from the fuel pump 34 and arranged to shift the fuel from pump 34 to either the line 68 leading to the propeller turbine combustion chambers 44 or the lines 70, 70a and 70b to the rotor wing combustion chambers. The valve 64 is coupled to the control shaft 62 by means of a linkage generally indicated at 72.

The shift of ignition is accomplished by means of a switch diagrammatically illustrated at 74 and having an armature 76 coupled to the control shaft 62. The switch 74 is provided with arcuate fixed contacts 78 and 80 connected to the conductors 82 and 84 respectively leading to the sparkplugs of the propeller turbine combustion chambers 44 and the rotor wing combustion chambers. The armature is electrically connected to a source of electrical current (not shown).

The valve 64 and the switch 78 are so arranged that the fuel and spark, as in the case of the compressed air, are furnished to both the propeller turbine combustion chambers and the rotor wing combustion chambers in intermediate positions of control shaft 62.

As disclosed in my copending application, Serial Number 43,729, filed August 11, 1948, the various controls advantageously may be so arranged that in shifting the compressed air, fuel and ignition from one set of combustion chambers to another, the order of operation is such that first the spark, then the compressed air and then fuel are supplied to the other combustion chamber and then the fuel, then the compressed air and then the spark are removed from the one. This minimizes the possibility of the presence of explosive mixtures in the combustion chambers not in use.

The arrangement illustrated and described is such as to provide efficient utilization of the energy available in the fuel consumed. It also provides convenient shifting of power between the propeller and the rotor wing in a convertible aircraft. It should be emphasized, however, that the particular embodiment illustrated and described is intended as merely illustrative of the invention and in no way restrictive thereof.

What is claimed is:

1. In a convertible aircraft of the type having a rotatable wing convertible from fixed to rotating attitude, a power plant comprising a compressor, a manifold communicating with said compressor, at least one compressor turbine combustion chamber communicating with said manifold for the receipt of compressed air through said manifold from said compressor, a compressor turbine communicating with said compressor turbine combustion chamber for the receipt of combusted gas therefrom, said compressor turbine being coupled to said compressor for drying thereof, at least one propeller turbine combustion chamber communicating with said compressor for the receipt of compressed air therefrom, a propeller turbine communicating with said propeller turbine combustion chamber for the receipt of combusted gases therefrom, ducts communicating with said manifold for conducting compressed air therefrom to combustion chambers in the rotatable wing of said aircraft, a first valve between said manifold and said propeller turbine combustion chamber, and a second valve between said manifold and said ducts whereby to control the disposition of compressed air therefrom to said propeller turbine and said ducts.

2. In a convertible aircraft of the type having a rotatable wing convertible from fixed to rotating attitude, a power plant comprising a compressor, a manifold communicating with said compressor, at least one compressor turbine combustion chamber communicating with said manifold for the receipt of compressed air through said manifold from said compressor, a compressor turbine communicating with said compressor turbine combustion chamber for the receipt of combusted gas therefrom, said compressor turbine being coupled to said compressor for driving thereof, at least one propeller turbine combustion chamber communicating with said compressor for the receipt of compressed air therefrom, a propeller turbine communicating with said propeller turbine combustion chamber for the receipt of combusted gases therefrom, ducts communicating with said manifold for conducting compressed air therefrom to combustion chambers in the rotatable wing of said aircraft, a first valve between said manifold and said propeller turbine combustion chamber, a second valve between said manifold and said ducts, and means interconnecting said first and second valves for simultaneous and opposite variations of the setting thereof.

3. In an aircraft convertible from rotating to fixed wing flight and vice versa the combination of a rotatable wing; and propeller means; and a power plant comprising a compressor, a manifold communicating with said compressor, at least one compressor turbine combustion chamber communicating with said manifold for the receipt of compressed air through said manifold from said compressor, a compressor turbine communicating with said compressor turbine combustion chamber for the receipt of combusted gas therefrom, said compressor turbine being coupled to said compressor for driving thereof, at least one propeller turbine combustion chamber communicating with said compressor for the receipt of compressed air therefrom, a propeller turbine connected to said propeller means and communicating with said propeller turbine combustion chamber for the receipt of combusted gases therefrom, ducts communicating with said manifold for conducting compressed air therefrom to combustion chambers in the rotatable wing of said aircraft, a plurality of valves arranged to control the disposition of said compressed air.

4. In combination a convertible aircraft, having a lifting surface convertible from rotating to fixed attitude and vice versa; a driving propeller; a power plant comprising a compressor for furnishing compressed air to a plurality of combustion chambers, a compressor turbine coupled to said compressor, a second turbine coupled to said propeller, at least one of said combustion chambers being positioned so the exhaust gases therefrom drive said compressor turbine with at least one other combustion chamber positioned to drive directly said propeller turbine and valve means for selectively conveying said compressed air to said propeller combustion chambers or to combustion chambers in the tips of said rotating wing whereby a smooth and quick transition from rotating to traction flight is obtained.

5. The combination as claimed in claim 3 wherein said propeller turbine also communicates with said compressor turbine for the receipt of combusted gases therefrom after said gases have passed through said compressor turbine.

References Cited in the file of this patent

UNITED STATES PATENTS

| Number | Name | Date |
|---|---|---|
| 2,243,467 | Jendrassik | May 27, 1941 |
| 2,371,889 | Hermitte | Mar. 20, 1945 |
| 2,427,845 | Forsyth | Sept. 23, 1947 |
| 2,540,190 | Doblhoff | Feb. 6, 1951 |

FOREIGN PATENTS

| Number | Country | Date |
|---|---|---|
| 493,174 | Great Britain | Oct. 4, 1938 |
| 594,207 | Great Britain | Nov. 5, 1947 |

OTHER REFERENCES

The Pressure-Jet Helicopter, published in "Flight," June 9, 1949, on pages 672–674.